(No Model.)

S. STORR.
CASTER COLTER AND JOINTER.

No. 441,780. Patented Dec. 2, 1890.

Witnesses
Albert Popkins
Wilton Cunningham

Inventor
Sellers Storr
By his Attorney

UNITED STATES PATENT OFFICE.

SELLERS STORR, OF BLOOMINGTON, ILLINOIS.

CASTER COLTER AND JOINTER.

SPECIFICATION forming part of Letters Patent No. 441,780, dated December 2, 1890.

Application filed September 24, 1890. Serial No. 365,990. (No model.)

*To all whom it may concern:*

Be it known that I, SELLERS STORR, of Bloomington, in the county of McLean and State of Illinois, have invented certain new and useful Improvements in Caster Colters and Jointers; and I do hereby declare the following to be a full, clear, and exact description of the invention, such as will enable others skilled in the art to which it appertains to make and use the same.

My invention relates to improvements in caster colters and jointers, the object of the same being to provide a caster-colter made in sections and secured together by means of dished spokes running to a common center.

A further object is to provide a jointer located in rear of the axis of the colter, the same being adjustably attached thereto, so that it may be moved backward and forward, thereby regulating the depth at which said jointer will enter the ground.

With the above ends in view my invention consists in the certain features of construction and combinations of parts, as will be hereinafter fully described, and pointed out in the claims.

Figure 1:
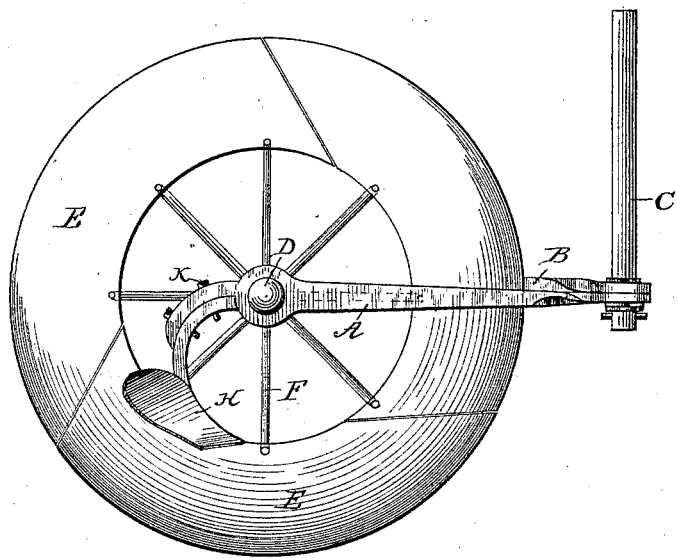
Figure 2:
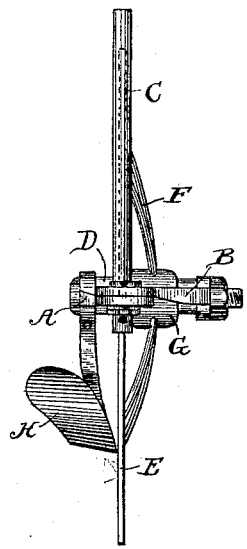

In the accompanying drawings, Figure 1 is a side elevation and Fig. 2 an edge elevation.

A and B represent the caster forks or arms mounted on the colter-standard C. In the rear of the arm A and near the rear of the arm B is journaled the axle D.

E represents the caster, made in segments, with the opposite ends of each running in transverse or opposite angles, thereby insuring an even brace-joint when the same are connected. The segments are connected by means of the dished spokes F, which afford a firm and rigid attachment, the opposite ends thereof running to a common center designated as "hub G." The spokes are dished, as shown, in opposite directions from the jointer H, thereby dividing the draft half-way between the spokes and the jointer. The forked arm B is extended beyond the arm A and is curved downwardly to receive the jointer H, which is provided with elongated slots to receive bolts K, by means of which the jointer may be so regulated as to cut at any desired depth.

By making the caster in sections a great saving of steel is accomplished and an efficient and durable caster is afforded at a very slight cost.

By employing the above devices a thin and narrow strip of soil will be turned, leaving a perfectly clean joint, and turning the trash into the bottom of the furrow, where it proves most valuable to the richness of the soil.

Having fully described my invention, what I claim as new, and desire to secure by Letters Patent, is—

1. In combination with the standard C, the arms A B, mounted thereon, the arm B extended downwardly and carrying the adjustable jointer, and a segmental caster connected by spokes running to a common center, substantially as shown and described.

2. A caster made in segments, with the ends thereof running at oblique angles, and dished spokes connecting said segments, substantially as shown and described.

In testimony whereof I have signed this specification in the presence of two subscribing witnesses.

SELLERS STORR.

Witnesses:
 THOMAS J. READ,
 LAIN WELTY.